United States Patent
Flagg

(10) Patent No.: US 6,456,979 B1
(45) Date of Patent: Sep. 24, 2002

(54) METHOD OF EVALUATING A PERMANENT LIFE INSURANCE POLICY

(75) Inventor: Barry D. Flagg, Tampa, FL (US)

(73) Assignee: The InsuranceAdvisor Technologies, Inc., Tampa, FL (US)

( * ) Notice: Subject to any disclaimer, the term of this patent is extended or adjusted under 35 U.S.C. 154(b) by 115 days.

(21) Appl. No.: 09/694,899

(22) Filed: Oct. 24, 2000

(51) Int. Cl.$^7$ ................................. G06F 17/60
(52) U.S. Cl. ............................. 705/4; 705/2
(58) Field of Search ................. 705/1, 2, 3, 4

(56) References Cited

U.S. PATENT DOCUMENTS 5,523,942 A   6/1996  Tyler et al.
5,956,691 A   9/1999  Powers

FOREIGN PATENT DOCUMENTS

JP    359017656 A  *  1/1984
JP    02001088468 A  *  4/2001

OTHER PUBLICATIONS

P. Booth, R. Chadburn, D. Cooper, S. Haberman, D. James, Modern Actuarial Theory and Practice, Chapman & Hall/CRC, 1999, Boca Raton, London, New York, Washington, D.C.

Kenneth Black, Jr. and Harold D. Skipper, Life Insurance, 12th Edition, Prentice–Hall, Inc., 1994, Englewood Cliffs, NJ.

Kenneth Black, Jr. and Harold D. Skipper, Life & Health Insurance, 13th Edition, Prentice–Hall, 2000, Upper Saddle River, NJ.

* cited by examiner

Primary Examiner—Sam Rimell
(74) Attorney, Agent, or Firm—Anton J. Hopen; Smith & Hopen, P.A.

(57) ABSTRACT

A method of evaluating a permanent life insurance policy including the steps of establishing a benchmark cost of insurance value, obtaining a policy illustration, resolving an illustrated cost of insurance value from the policy illustration, and comparing the benchmark cost of insurance value with the illustrated cost of insurance value. A matrix of mortality profiles may be established wherein the benchmark cost of insurance is adjusted in relation to the matrix. The matrix may include gender-based, lifestyle and pricing method risk values. Gender-based risk values reflect the differing mortality rates experienced between males and females over a lifetime. Lifestyle-based risk values may acknowledge dangerous activities such as tobacco use, job occupation and the like. Pricing method risk values are based on the statistical evidence that affluent individuals generally lead healthier lifestyles while also purchasing substantial policy values.

34 Claims, 7 Drawing Sheets

---

210

COI constant for lifestyle, gender and pricing method: $COI_{Adj}$

Benchmark premium load value: $PLV_{BM}$

Benchmark fixed expense value: $FEV_{BM}$

Average net amount at risk: $NAR_{Avg}$

220

Pricing policy benchmark: $PP_{BM}$ $$PP_{BM} = \frac{(COI_{Adj} + PLV_{BM} + FEV_{BM})}{NAR_{Avg}}$$

Establishing an illustrated net average policy earning value: $PEV_{Net}$ $$PEV_{Net} = PEV_{Illustrated} - Fees_{Managment}$$

Benchmark policy-value-based expense value: $PEVBM_{Net-Net}$ ← Average of industry expenses { M&E, Other Expenses }

$PEV_{Net-Net}$ policy earning value:

$$PEV_{Net-Net} = PEV_{Net} - PEV_{M\&E}$$

Where:

$PEV_{M\&E}$ = Mortality and Expense Charges

Calculation Period: CP
Death benefit at Year 0 of benchmark policy: $DB_{BM}$
Benchmark policy cash value at beginning of CP: $CV_{BM}$
Benchmark policy premium paid during CP: $PREM_{BM}$
Benchmark policy premium loads deducted during CP: $L_{BM}$
Benchmark policy fixed policy expenses deducted during CP: $FE_{BM}$
Benchmark policy earnings credited to policy cash values during CP: $EARN_{BM}$

200

Average net amount at risk: $NAR_{Avg}$ $$NAR_{Avg} = \frac{\sum_{CP} DB_{BM} - \left(\left(CV_{BM} + PREM_{BM} + EARN_{BM}\right) - \left(L_{BM} + FE_{BM}\right)\right)}{CP}$$

METHOD OF EVALUATING A PERMANENT LIFE INSURANCE POLICY

FIELD OF INVENTION

This invention relates to a method for evaluating financial information, and more specifically to evaluating permanent life insurance policies for cost and performance criteria.

BACKGROUND OF THE INVENTION

The permanent life insurance product is the most complex financial instrument that is purchased or owned by the general market of consumers, combining the benefits and costs otherwise found in insurance and investments into a single financial instrument. For instance, like term insurance, all permanent life insurance policies pay a death benefit. All permanent life insurance products include some form of a term-insurance-like "risk" premium, usually referred to as the Cost of Insurance Charges (herein "COIs"). In addition to this death benefit, all permanent life insurance products include a living benefit in some form of account value, commonly referred to as the cash surrender value. This account value is the surplus or excess premium paid into the policy above and beyond the various policy charges, and is invested into either the insurance company's general account of predominantly bonds and mortgages in the case of universal life products, or a variety of mutual-fund-like separate accounts in the case of variable life products. All permanent life insurance products include policy charges for investment management fees, investment advisory fees, and fund operating expenses, like Certificates of Deposits and mutual fund investments. Also like some mutual funds, permanent life insurance products can include a charge that is deducted from contributions to the policy, commonly referred to as a premium load. Lastly, permanent life insurance products can assess or include additional policy charges unique to the permanent life insurance products itself, like state premium taxes, federal deferred acquisition costs (herein "DAC") taxes, fixed or flat administration charges, and Mortality and Risk Expense (herein "M&E") charges.

While owners of whole life insurance, and other similar permanent life insurance products have always paid either some or all of the above charges, these charges had been "bundled" into an overall "fixed" policy premium calculated based on these underlying pricing factors, but were known only to insurance company actuaries, and were hidden from view of the policy owner. However, with the introduction of universal life in 1986, these policy charges were "unbundled", disclosing for the first time the individual policy pricing components as to COIs, premium loads, fixed policy expenses, and account-value-based charges. At the time, this information was only available through the duly licensed agent of the life insurance company underwriting and distributing the given product, or from the insurance company itself. While policy expenses were "unbundled", this information was not widely available, was almost never separately evaluated, considered or included in the decision to purchase a particular product, and was customarily only disclosed or communicated by virtue of an annual statement for the policy produced on the policy anniversary (i.e. more than 1-year after the purchase of the given policy). With the advent of variable life insurance products, the level of disclosure has increased to further disclose and publish for general public consumption all guaranteed pricing factors determining the maximum policy charges, and most of the current pricing factors reflecting the policy expenses currently applicable. Of the 4 basic types of charges: (1) COIs, (2) Premium Loads, (3) Fixed Policy Fees, and (4) Account-Value-Based charges, all are disclosed and published on both a current and guaranteed basis, except COIs. Because these COIs are typically the most influential determinant of policy pricing, contributing as much as 75% of the total premium of a given policy, any comparison of policy pricing that does not include COIs is at least inconclusive, and potentially misleading.

Cost of Insurance Charges (COIs)

COIs are deductions from permanent life insurance policies to cover anticipated payments for claims. As with most types of insurance, claims are, and arguably should be, the largest single cost factor of any insurance policy (if claims are not the largest single cost factor, then is the product really insurance against the risk of some claim, or something else?). With life insurance, COIs typically account for about 75% of the total premium, and, as expected, the higher the claims, the higher the premiums. COI charges are calculated year-by-year as the result of the policy death benefit (see net amount at risk below) multiplied times a COI rate provided by the insurance company for each age corresponding to each policy year for each product. These deductions are much like term life insurance premiums in that they are predominantly for claims paid during a given period (typically 1 year). For this reason, COIs are frequently referred to as the pure "risk" portion of the premium, reimbursing the insurance company for the risk associated with paying the death benefit. Because the risk of death increases with age, so do the COIs.

For example, assume an insurance company provides permanent life insurance for a group of 1,000 policyholders whom all are insured for $100,000 and three (3) insureds out of the group of 1,000 die in a given year. The insurance company pays $300,000 to the beneficiaries of those three insureds. The insurance company must collect $300 from each policy owner over the course of the period in order to pay this $300,000 in claims (i.e. 1,000 policyholders×$300= $300,000 in death claims paid). In this case, the COI Rate would equal $3.00 per $1,000 of death benefit (i.e. each insured paid $3.00 multiplied times 100 for each $1,000 of death benefit).

Of course, as the average age of the population of 1,000 in the group ages, then the risk of more deaths increases. For example, the next year, all insureds are a year older, and because the probability of death increases with age, we assume that four (4) insureds out of population of 1,000 die in this next year (for simplicity sake, we will assume that the insurance company sold three (3) new $100,000 policies to replace the three $100,000 policies removed from our pool by the three deaths in the prior year). The insurance company will pay $400,000 to the beneficiaries of those four insureds. The insurance company must collect $400 from each policy owner over the course of the period in order to pay this $400,000 in claims (i.e. 1,000 policyholders×$400= $400,000 in death claims pad/to be paid). In this case, the COI Rate would equal $4.00 per $1,000 of death benefit (i.e. each insured paid $4.00 multiplied times 100 for each $1,000 of death benefit).

This example also assumes the insurance company collects only the exact amount necessary to pay these claims. However, in reality, the insurance company must also collect a profit to remain in business. Actual COIs in this example would, therefore, be slightly higher to cover anticipated claims, but then also to provide a profit to the insurance company providing the insurance and bearing the risk. In addition, some insurers "load" the COIs to cover other policy expenses that are not disclosed elsewhere. For instance, some policies are marketed as "no-load" or "low-load" policies, and as such do not disclose certain policy expenses or loads. The expenses or loads that are typically "hidden" are sales loads, and other premium based loads. However, because certain premium based loads must be paid (e.g. state premium taxes, federal deferred acquisition costs (DAC) taxes, and the cost to distribute the policies), some insurers "hide" these costs inside "loaded" COIs.

As mentioned above, in all cases, these COIs are calculated each policy year as the result of the policy "net at risk" death benefit multiplied times a COI Rate provided by the insurance company for each age corresponding to each policy year for each product. This "net at risk" death benefit is that portion of the total death benefit in excess of any policy cash value. For example, one of the defining characteristics of permanent life insurance policies is that they have a cash value in addition to the death benefit. This cash value typically increases over time. Death benefits can either remain level, in which case this "net at risk" death benefit changes from year to year. Depending upon the design of the policy, death benefits can also, at the policy owner's election, increase along with the cash value over time, in which case this "net at risk" death benefit remains the same from year to year. While different policies can calculate the "net at risk" death benefit differently, this Net Amount at Risk can be generally represented as follows:

$$NAR_{Year} = DB_{Year} - CV_{Year}$$

Where:

$NAR_{Year}$=Net amount at risk during a policy year.

$DB_{Year}$=Total death benefit during a policy year.

$CV_{Year}$=Policy cash account value during a policy year.

It should be noted that the above-illustrated analysis is not necessarily tied to an annual period. Semi-annual, monthly or other time frames may be incorporated to resolve the net amount at risk during a time frame.

It is common for permanent life insurance policies with a level death benefit to be priced such that policy cash values and policy death benefits become equal by design at the maturity or endowment age of the policy (defined by statute between age 95 and 100 depending on the policy). As such, as cash values increase and the death benefit remains level, the "net at risk" death benefit (or net amount at risk) declines.

On the other hand, permanent life insurance policies with an increasing death benefit are typically priced such that policy cash values become equal to the originally issued face amount, while the total death benefit is either equal to, or approximates this originally issued face amount, plus the accumulated cash account value at any given point in time. As such, as cash values increase and in so doing push up the death benefit, the "net at risk" death benefit remains level.

As a result, the actual COIs for a given policy will be a function of the COI rate provided by the insurance company for each year of a given policy, the net amount at risk in each of those years of the given policy, and the design of the policy death benefit (i.e. level death benefit or increasing death benefit) for the given policy.

Insurance Expenses and Charges

While different insurance companies use different naming conventions for what can appear to be many different types of expenses and charges associated with a given policy, these various policy expenses are customarily disclosed as State Premium Taxes, DAC taxes, Sales Loads/Expenses, Underwriting Charges/Expenses, Policy Issue Charges/Expenses, Policy Administration Charges/Expenses, Administration Expense Charges/Fees, Policy/Contract Maintenance Charges/Expenses, Policy Service Fees/Expenses, Mortality and Expense Risk Charges (variable products only), Investment Management Fees, Investment Advisory Fees, Fund Operating Expenses, and Other Carrier Loads/Charges/Fees. However, despite this confusing variety of terms, all policy expenses can be grouped/categorized by the nature of the expense into 3 basic types: 1) Premium-Based Charges, 2) Cash-Value-Based Charges, and 3) Fixed-Type Charges.

1. Premium-Based Charges:

Premium-Based Charges are charged to policyholders as a percent of the premium paid in a given year and typically ranges between 0% and 35%. Premium-based charges customarily cover state premium taxes that average 2.50%, DAC taxes averaging 1.5%, and Sales Loads/Expenses ranging between 0% and 30%. Carriers may also impose a premium-based charge. In addition, while state premium taxes and DAC taxes are generally calculated by the respective government agencies as a percent of premium, and while insurance companies must certainly pay these taxes, insurance companies are not required to assess the charge as a percent of premium. As such, some insurance companies charge no (i.e. 0%) premium charges, and collect state and federal taxes from other charges within the policy (usually COIs).

Premium-based charges can also vary depending on either the policy year in which a premium is paid and the level of the premium paid into a given policy. For instance, a higher premium load may be assessed in the early policy years to recover up-front expenses related to underwriting, issue and distribution of a given policy. After these up-front expenses have been amortized (frequently over a period of ten policy years), premium loads are then often reduced to cover the relatively lower policy owner service and policy administration expenses. In addition, a higher premium load may be charged on actual premiums paid up to a "Base Policy Premium" or "Target Premium" level, while a lower premium load may be charged on actual premiums paid in excess of this "Base Policy Premium" or "Target Premium" amount. This "Base Policy Premium" or "Target Premium" is generally the premium which, if paid every policy year, would endow or mature the policy for its originally issued face amount based on guaranteed policy pricing assumptions as to COIs, expenses and earnings. In other words, "Base Policy Premium" or "Target Premium" is calculated by actuaries of the insurance company such that if the insurance company charged the maximum allowable under the terms of the policy contract, and if the policy owner paid the "Base Policy Premium" or "Target Premium" every year, then the policy would guarantee to pay a death benefit regardless of the age of death of the insured.

This "Base Policy Premium" or "Target Premium" is, therefore, analogous to the "insurance premium" (i.e. that premium typically paid to maintain the insurance). Premium amounts paid into the policy in excess of this "Base Policy Premium" or "Target Premium" can, therefore, be viewed as "excess premium" above and beyond that which required supporting a given insurance death benefit. The reason a policy owner would decide to pay this "excess premium" could be to either create a cash value reserve which can be used to pay future premiums, COIs and policy expenses from within the policy effectively pre-paying future premium otherwise due from the policy owner, and to accumulate wealth in the form of policy cash values that benefit from preferred federal income tax treatment and special protection from the claims of creditors under state law. As such, premiums paid up to the "insurance premium" are subjected to "insurance loads" to cover policy expenses unique to the insurance component of the policy, while premiums paid in excess of the "insurance premium" are subjected to a lower level of loads on those monies contributed toward policy cash values. While different policies can calculate premium loads differently, these charges can be generally represented as follows:

$$PL_{Year}=(PREM_{Target})(PL_{Target})+(PREM_{Excess})(PL_{Excess})$$

Where:
- $PL_{Year}$=Calculated Premium Loads
- $PREM_{Target}$=Target Premium
- $PREM_{Excess}$=Total Premium Paid in Excess of Target Premium
- $PL_{Target}$=Premium Load Percentage Up to Target Premium
- $PL_{Excesse}$=Premium Load Percentage After Target Premium is Paid 2. Cash-Value-Based Charges:

Cash-value-based charges are charged to policyholders as a percent of either the policy cash account values (i.e. the total cash value of a given policy) or the policy cash surrender value (i.e. the cash value of the policy less any surrender charges or cancellation fees that would apply on the surrender or cancellation of the policy). All permanent life insurance products include a living benefit, in addition to the death benefit, in the form of this cash account value or cash surrender value. This surrender value is the surplus or excess premium paid into the policy above and beyond the various policy charges. These surrender values are invested into either the insurance company's general account of predominantly bonds and mortgages in the case of whole life and universal life products, or a variety of mutual-fund-like separate accounts selected by the policy owner in the case of variable life products.

Cash-value-based charges are most commonly calculated as a percent policy cash account values, typically range between 0.00% and 4.00% in total, but are divided by their nature into two (2) different types of cash-value-based charges; 1) fund-level or fund-specific charges, and policy-level or policy-specific charges. Fund-level or fund-specific charges relate specifically to the investment portfolio or separate accounts funds upon which the cash value is based. Examples of fund-level or fund-specific charges include, but are not limited to charges at the investment fund or portfolio level for investment management fees, investment advisory fees, and fund operating expenses, but these charges may or may not be disclosed depending upon the type of the policy (e.g. whole life and universal life policies do not customarily disclose fund-level or fund-specific charges while variable products do publish these expenses.)

In addition, because fund-level or fund-specific charges are a function of the underlying investment portfolio or separate account funds, which may or may not be disclosed, and which can be, and usually is different for different policies of the same product line, then these fund-level or fund-specific charges are more of a investment expense than a policy expense, and therefore should only be considered when comparing investment or separate account fund selections, and not when comparing policy level costs. On the other hand, policy-level or policy-specific charges relate specifically to the policy itself, without regard to underlying portfolio investments or separate account fund selections. The most common policy-level or policy-specific cash-value-based charge is the M&E charge intended to cover the risks assumed by the insurance company that actual cost of insurance charges will be greater than expected (i.e. insureds live less time than anticipated resulting in increased claims) and that actual expense charges will be greater than expected.

Some products also include policy-level or policy-specific cash-value-based charge in addition to the M&E charge, both of which can vary depending on the year of the policy (e.g. 1.00% of cash values during the first 10 policy years, and 0.5% of cash values thereafter). Because these policy-level or policy-specific cash-value-based charges are specific to the policy, without regard to the underlying investment portfolio or separate account fund selections, they are truly a policy cost to be considered when comparing one policy to another. As such, while different policies can calculate policy-level or policy-specific cash-value-based charges differently, these charges can be generally represented as follows:

$$CVC_{Year}=CSV_{Year} \times CVCP_{Year}$$

Wherein:
- $CVC_{Year}$=Cash-value-based charges for a selected year;
- $CSV_{Year}$=Cash surrender value for the selected year; and
- $CVCP_{Year}$=Cash value based charge percentage for the selected year.

3. Fixed-Type Charges:

Fixed-Type Charges are charged to policyholders as some fixed amount calculated at the time the policy is issued either as a flat monthly charge (e.g. $10.00 a month), or in relation to the originally issued policy face amount (e.g. $1.00 per $1,000 of policy face amount). While this charge is fixed in amount at the time the policy is issued, it can vary by predetermined schedule depending on the year of the policy (e.g. $10.00 a month and $1.00 per $1,000 of policy face amount during the first 10 policy years, and $5.00 a month and $0.00 per $1,000 of policy face amount thereafter). While different policies can calculate Fixed-Type Charges differently, these charges can be generally represented as follows:

$$FTC_{Year} = (FTC_{Flat} \times 12) + \left(FTC_{Amt} \times \frac{DB}{1,000}\right)$$

Where:
- $FTC_{Year}$=Fixed Type Charges for each policy year.
- $FTC_{Flat}$=Monthly Fixed Type Charges
- $FTC_{Amt}$=Fixed Type Charges Per $1,000
- DB=Death benefit In addition, fixed-type charges can also include contingent or back-end policy surrender charges that are deducted from the policy cash account value upon surrender or cancellation/termination of the policy. These surrender charges are calculated in relation to the initially issued policy face amount and can be as much as 100% of the target premium (defined above) for policies available to the general public at large (i.e. policies commonly referred to as "Retail Policies"), but can be less or even 0% for policies purchased in larger volumes (i.e. frequently referred to as "Institutionally-Priced" policies). In either case, this surrender charge typically remains level for an initial period of years (e.g. 5 years), then reduces to $0 over a following period of years (e.g. policy years 6–10 or 6 through 15).

$$SC_{Year} = SC_{Rate} \times \frac{DB}{1,000}$$

Where:
$SC_{Year}$=Surrender Charges for each policy year.
$SC_{Rate}$=Surrender Charges Per $1,000
DB=Death benefit It is for this reason that the current practice of shopping for permanent life insurance does not involve consideration and comparison of these individual cost components. Instead, shopping for a suitable permanent life insurance product involves the comparison of an illustration of hypothetical policy values for a given group of products based on a variety of variables, some of which are unique to the prospective insured, (e.g. such as age, income, health profile, lifestyle, etc.), and others that are unique to the given product. However, because of these variables that are unique to a given product, comparing illustrations as a means of determining suitability is frequently an inaccurate and erroneous process that can lead to inaccurate and erroneous conclusions. In addition to policy pricing variables that may be unique to a given product, different products also employ different methods of computing policy expenses and benefits. While individual pricing components may be disclosed, these computational methods are not, again leading to the potential for evaluating different products on a basis that is thought to be comparable, but which is actually different. Due to this complex nature of permanent life insurance products, consumers and advisors are frequently ill-equipped and unprepared to identify differences in the multifarious computations underlying the illustration of hypothetical policy values, again leading to the possibility that this method of policy evaluation can lead to an incorrect conclusion.

Simply defined, insurance is the payment of a premium today in return for the payment of a claim as some future point. The factors considered in the selection and purchase of all life insurance policies can be reduced to the following three factors: (1) the financial strength and claims paying ability of the insurance company underwriting and issuing the insurance product, (2) the brand value of the insurance company underwriting and issuing the insurance product, and (3) the premium, price, or cost for the insurance product.

While information is readily available from a variety of Ratings Services (e.g. AM Best, Standard & Poors, Moody's, etc.) who evaluate the financial strength and claims paying ability of virtually every insurance company, there is no independent source of pricing information for the majority of life insurance products purchased. Presently, the only sources for information as to how much an insurance policy should cost is limited to:

1) Premium Search Engines for fixed-premium and fixed-benefit products like Term Life Insurance;
2) Morningstar PrincipiaPro for certain elements of variable life insurance products; and
3) agents and brokers who represent a one or more life insurance companies.

However, each of these information sources answer only part of the question as to how much an insurance policy should cost, and therefore are limited for a number of reasons.

There are a variety of "Term Insurance Search Engine" services available to the general public from a variety of providers such as Quotesmith®, InsWeb®, Compulife®, LifeLink, and the like. While some of these "Search Engines" provide consumers with the information necessary to determine how much they should be paying for term life insurance, these search engines have limited application simply due to the fact that term life insurance represents only a fraction of the life insurance products purchased, accounting for approximately ten percent of the total premiums paid for life insurance. In addition, because term insurance premiums for an individual policy are a fraction of the premium otherwise payable for some form of permanent insurance, the premium savings available to consumers who are now able to comparison shop by virtue of access to this information are also only a fraction of the savings available from a similar service for permanent life insurance products. On the other hand, a strong demand for life insurance pricing information in general is clearly demonstrated by the shear number of term insurance search engine service providers and the widespread popularity of these services.

Morningstar, Inc. publishes a collection of pricing information for some, but not all of the pricing variables used to calculate premiums for a variety of variable life and variable universal life insurance products. For instance, Morningstar includes in its publication information relating to the premium-based loads, the fixed policy charges, and the asset-based expenses. However, Morningstar does not include in its database any information relating to the COIs. Because these COIs contribute as much as 75% of the total cost of a given policy, the Morningstar service cannot be used to answer the question as to how much the variable life and variable universal life policies should cost.

The most complete source of life insurance pricing information is the community of life insurance agents and brokers at large. Only they are provided with reliable policy pricing data by the authors of this information—the life insurance companies that "manufacture" the various life insurance products. However, while the agent and broker are the most reliable source of pricing information for a particular product, they typically represent a small fraction of the insurance companies (frequently only a single insurance company) offering products in the general market. They are not a reliable source of enough product pricing data to be able to reliably answer the question as to how much life insurance should cost and which is the most suitable product for a given consumer. In addition, the current practice employed by agents, brokers and advisors to compare policy information is inherently flawed.

As a result, while consumers have access to pricing information for the limited market of term insurance products, and limited information about the market of permanent life insurance products, or complete information about a limited number of products (frequently a very limited number of products), the consumer is not privy to the assumptions behind the calculations that make up policy illustrations.

Permanent insurance products are still going to incur life insurance operating and mortality costs that have to be covered before passing on the surplus to policy owners in the form of cash value accumulations. Currently, the consumer is not privy to the assumptions behind the calculations that make up policy illustrations. In the absence of this critical information, consumers and their advisors are vulnerable to financial exploitation and misunderstanding during the policy selection process. A policy illustration shows how a life insurance policy is structured and is used in an attempt to compare one policy with another. The illustration typically shows patterns of charges in premium outlays, cash-value accumulation and death benefits. Variations between two policies may result from differences in company operational efficiency, investment performance, underwriting policy, profit objects, the costs associated with marketing, and a host of other variables. Consumers often erroneously associate a policy's premium with its cost. Cost includes, not just premiums, but additional elements of a policy such as death benefits, cash values and dividends.

Retail Pricing

Insurance carriers pool policies to make risks more predictable. (See Law of Large Numbers.) In fact, the larger the pool, the more predictable the risk. Pooling, which combines large and small policies and low and high risk segments of the pool, averages the variables that contribute to premium prices.

In effect, this averaging cross-subsidizes smaller transactions and higher-risk segments with excess "profits" from the larger transactions and lower-risk segments in the pool. (See Problems with Pooled Products.) Consequently, for larger transactions and lower-risk buyers, Retail Pricing may not represent the best value.

However, most insurance buyers have access only to Retail Pricing. While most products will continue to be priced to serve this largest segment of the market, a growing number of select buyers are gaining access to Institutional and Experience-Rated Institutional Pricing Large public companies purchase insurance differently than the average "retail" buyer. Because these large transactions and large groups of policies cost less to sell and administer, carriers typically reduce institutional premiums to reflect volume discounts and economies of scale.

While institutional products are becoming more widely available, threshold financial requirements still limit access to Institutional Pricing that offers lower premiums to only a small percent of insurance buyers.

Experience-Rated Pricing

In addition to the same advantage of lower expenses offered by institutional pricing, experience-rated pricing also offers the benefit of lower COI charges.

Experience-rated products are generally either proprietary products to a given block of businesses or available on a private placement basis to qualified buyers.

Experience-rated products are based on the superior claims experience of professionals, business executives and owners, and high net worth individuals. Because this group enjoys healthier lifestyles and better health care, they live longer. As a result, this group experiences lower mortality rates, and products priced for this market generally have lower COI charges than products sold to retail and institutional markets.

There is presently no technology for the comparison of permanent life insurance products. The only existing technology involves the comparison of "fixed premium and fixed benefit" products, like term life insurance, where a predetermined premium is stipulated for a given amount of coverage. In this application, this current technology involves the creation of a database of published information and then simply searching this database for this fixed rate based on the amount of coverage and a number of other factors like age, gender, risk profile, etc. However, due to the lack of published information about the pricing of permanent life insurance products, and due to the number of combinations and permutations of the number of variables involved in the pricing of an individual life insurance product, the current database-search-engine-like technology does not lend itself to the comparison of permanent life insurance products. For this reason, the consumer is currently relegated to, for lack of a superior method, seeking out this information on their own, but limited to the extent that they have a personal relationship with a sufficiently large number of life insurance agents or brokers who are properly licensed to sell a given life insurance product or products as to be able to obtain the information on a wide enough variety of products to make an informed decision as to the most suitable product for the given need.

Life insurance policies that are promoted on the basis of a permanent insurance product are still going to incur life insurance operating and mortality costs that have to be covered before passing on the surplus to policy owners in the form of cash value accumulations. Currently, the consumer is not privy to the assumptions behind the calculations that make up policy illustrations. In the absence of this critical information, consumers and their advisors are vulnerable to financial exploitation and misunderstanding during the policy selection process.

The premium charge alone depends on several factors including (1) the exposure of the policyholder and the insured goods or services to the various insured perils; (2) the degree of risk associated with the policyholder; (3) the expenses of acquiring and administering the business; and (4) the profit required by the insurer. *Modern Actuarial Theory and Practice*. Booth et al., Chapman (1999) at page 307.

The objective of any method used to compare two policies is to resolve the best value for the consumer. At least eight (8) distinct methods of comparing life insurance policy costs have been suggested in *Life & Health Insurance*: $13^{th}$ *Edition*. Black, Kenneth, Jr., Skipper, Harold D., Jr. Prentice Hall (2000), at page 283: traditional net cost, interest-adjusted net cost, equal outlay, cash accumulation, comparative interest rate, internal rate of return, yearly rate of return, and yearly price. However, none of the methods seamlessly provide a true cost comparison between two permanent life insurance policies. Nor do the methods suggest resolving a benchmark value for comparing a plurality of products against an industry baseline.

As a result, in the current environment, the consumer is confronted with the challenge of selecting a suitable permanent life insurance product, that is complex in nature with pricing based on many different pricing factors, but with limited disclosure of those pricing factors, and therefore a limited ability to compare pricing information. In addition, what pricing information that is available is generally evaluated and compared using an inaccurate and erroneous means, by default, and the only source for reliable pricing information is limited a subset of the full universe of products that could otherwise be suitable. These circumstances have resulted in a process for selecting and purchasing a suitable permanent life insurance product in which 1) the consumer frequently seeks the advise of an independent advisors (e.g. certified public accountants, attorneys, bankers, certified financial planners, stockbrokers, consultants, etc.), 2) these independent advisors request pricing information (i.e. an illustration of hypothetical policy values) from those agents and brokers with whom they have relationships, 3) these agents and brokers produce the requested illustration of hypothetical policy values from data and systems provided them by the insurance companies whom they represent, and then 4) for lack of an alternative, the consumer compares these illustrations, often with the help of one of the advisors, to attempt to identify the most suitable product. However, each of these illustrations of hypothetical policy values is comprised of between 6 and 20 pages, consisting of as many as 200+ distinct and unique policy values for each policy under consideration, involving the many abovementioned variables which may or may not be disclosed, and that are the result of the computational methodology with is not disclosed. The consumer is presented with formidable task of evaluating and comparing hundreds or thousands of data items in an effort to identify the most suitable product for their needs.

To complicate matters further, different products perform and illustrate differently, under different planned premium payment scenarios. In other words, one product may perform competitively as compared to other products when illustrated assuming one planned premium payment scenario, but under a different planned premium payment scenario, that same product may perform and illustrate inferior to the other products in its peer group. This is due to the construction of the various loads. For instance, a product with low fixed-type charges that do not vary with the level of funding (like COIs), and high premium-based charges (like sales and service loads), will perform optimally under a minimum premium scenario, but will be less competitively-priced relative to other peer products under maximum premium scenarios. Conversely, a product with high fixed-type charges, and low premium or account-value-based charges (M&E charges), will perform optimally under a maximum premium scenario, but will be less competitively-priced relative to peer products under minimum premium scenarios. The suitability of a given product is not only dependent upon the pricing of the individual pricing components and computational methodologies, which may or may not be disclosed, but is also dependent upon the construction of those pricing variables under different policy designs.

One drawback of the current evaluation methods is that many policies are purchased on the basis a single policy-pricing component rather than overall cost. For instance, some policies are marketed and sold as "no-load or low-load" policies, implying lower policy costs and expenses than "load" policies. However, while these policies do not assess a premium-based expense, these same products can charge increased COIs, increased fixed policy fees, and increased account-value-based charges to more than make up for the foregone premium load. While consumers certainly find appeal in and are attracted to these products, they may actually present an inferior value to that of a product that may include a premium load, but then also offer lower COIs or other policy expenses. Absent some means of uniformly evaluating and comparing policy costs, consumers can unwittingly purchase a less suitable product at a higher cost.

Another drawback of current methods is that "comparison shopping" for a suitable life insurance policy is severely handicapped, if not impossible, due to the fact that, while individual policy pricing components are disclosed, there is no means to compare the cost-competitiveness nor the pricing-adequacy of these individual cost components. For instance, when a consumer "goes shopping" for most other products, be it a tangible product or an intangible product, the consumer generally has access to the various features associated with a given product, as well as the cost of either the product, or the individual product features, or both. For example, when preparing to buy a tangible product, like a washing machine, consumers can refer to a variety of product information resources (e.g. Consumer Reports) to compare products, product features and price before actually buying the product. Likewise, when preparing to buy an intangible product, like a mutual fund, consumers can similarly refer to a variety of product information resources (e.g. Morningstar, Lipper, etc.) to compare products, product features (e.g. investment performance and the level of service) and price before actually buying the product. On the other hand, in the case of life insurance, there is no such means of comparison-shopping.

Comparison-shopping for permanent life insurance is also severely handicapped by "relationship barriers," limiting the number of products that can be considered to some subset of the total universe of products that could otherwise prove to be suitable. For instance, agents and brokers are the only reliable source of policy pricing information for a given product. However, agents and brokers are limited in the number of products for which they can be a source of reliable pricing information. This is because they are limited in the number of insurance companies they can represent for the following reasons: the insurance company prohibits them from representing other insurance companies; insurance company pays higher commissions and offer incentive trips for sales and marketing concentrated with that carrier; the current distribution system is so fragmented with so many agents and brokers representing so many different insurance companies, they are unable to concentrate these sales and marketing efforts beyond just a limited number of carriers; and without some means of compiling, organizing and reporting policy pricing information for the full universe of permanent life insurance products, they are simply limited in their ability to compile, organize and present this information themselves.

Because agents and brokers are limited in their ability to gain access to reliable policy pricing information, the consumer is limited in the number of products that may be considered by the relationships they may have with various licensed agents and brokers, and the relationships that their advisors may have with various licensed agents and brokers (referred to herein as "relationship barriers").

Present methods of "comparison shopping" for life insurance involve comparing projected policy pricing based on many unknown variables that are subject to change, and as such, often result in "apples-to-oranges" comparisons, and frequently lead to the selection of a less suitable product than that which is otherwise available. For instance, absent some uniform means of comparison shopping, shopping for a permanent life insurance product instead involves comparing illustrations of hypothetical policy values based on a variety of variables, some of which are unique to the prospective insured, (e.g. such as age, income, health profile, lifestyle, etc.), and others that are unique to the given product. However, because of these variables that are unique to a given product, comparing illustrations as a means of determining suitability is frequently an inaccurate and erroneous process that can lead to inaccurate and therefore erroneous conclusions. In addition to policy pricing variables that may be unique to a given product, different products also employ different methods of computing policy expenses and benefits. While individual pricing components may be disclosed, these computational methods are not, again leading to the potential for evaluating different products on a basis that is thought to be comparable, but which is actually different. Due to this complex nature of permanent life insurance products, consumers and advisors are frequently ill-equipped identify differences in the multifarious computations underlying the illustration of hypothetical policy values, again leading to the possibility that this method of policy comparison can lead to an incorrect conclusion.

The most influential policy cost determinants are the COIs. COIs are typically hidden from the consumer, and even when they are disclosed, there is still no uniform means of comparison. This is why term insurance is so appealing and why there has been resurgence in the purchase of term insurance.

Policies are purchased based on a projected premium calculated in an illustration of hypothetical policy values rather than selecting a policy based on an ascertainable and reasonably sustainable overall cost. For instance, because the current and only means of comparison shopping involves comparing illustrations of hypothetical policy values, which are based on many different variables, which may or may not be disclosed, there is no way to empirically measure them on an objective basis.

Policies are purchased on the basis a single policy pricing component rather than overall cost. For instance, some policies are marketed and sold as no-load policies, implying lower policy costs and expenses than "load" policies. However, while no-load policies do not assess a premium-based expense, these same products can charge increased COIs, increased fixed policy fees, and increased account-value-based charges to more than make up for the foregone premium load. While consumers certainly find appeal in and are attracted to no-load products, these products can actually present an inferior value to that of a product that may include a premium load, but then also offer lower COIs or other policy expenses. Absent some means of uniformly evaluating and comparing policy costs, consumers can unwittingly purchase a less suitable product at a higher cost.

Policies are purchased based on hypothetical illustrated performance rather than actual individual pricing components. For instance, without some means to identify all individual pricing variables, it is impossible to compare these variables to actual historical experience, and in so doing, consider whether or not a given policy is adequately priced to deliver the illustrated benefits. While past performance is no guarantee of future results, illustrated pricing that is consistent with actual mortality and expense experience would certainly offer the promise of greater reliability than a product priced on anticipated, but not actual experience. For instance, the illustration of hypothetical policy values for a given product may calculate a comparatively low and competitive premium. However, if that premium is based on inadequate or unrealistic mortality assumptions (e.g. the COIs illustrated for an actual product required 25% of all insureds in the risk pool to be alive at age 100), then the actual premium required will be higher than that illustrated. Absent some means of uniformly evaluating and comparing policy costs, consumers can unwittingly purchase a less suitable product that may appear to offer a lower cost, but which actually requires a higher cost.

Advisors have no independent, objective, information-based resource to reference in order to provide answers to these client questions, even though they are asked insurance related questions by their clients more often than any other party in life insurance value network. For instance, studies routinely show that advisors work more closely with their clients and have a more customer-intimate relationship than any other party to the life insurance value network. This is validated by another survey finding that advisors are asked insurance-related questions almost once a week, and is in contrast to the average life insurance agent who is infrequently asked insurance-related questions for fear the agent is only compensated directly for answers that lead to a new sale.

Consumers get caught in the middle between advisors and agents providing conflicting advise causing confusion, higher costs, less than optimal advice and a less than suitable product. For instance, consumers frequently seek the help of advisors in the areas of tax planning, retirement planning, estate planning, business succession and continuity planning, overall financial planning, and general insurance and benefit planning. The nature of this work is typically focused on the needs of the consumer independent of any given product, is usually based on planning principals generally available in the advisory community, and is customarily compensated on a fee-for-service basis for the time involved in this work. While an insurance product specialist who could advise the consumer as to the most suitable product from the complete universe of products available in the market would be a natural and valuable member of such a planning team, agents lack the ability to gather, analyze and compare policy pricing information for a meaningful representation of that full universe of products, for the reasons discussed above. Absent the ability to add value by contributing market knowledge and suitability recommendations from a broad universe of products, agents routinely "earn their keep" by offering advise in the same areas as the other members of the planning team. In addition, because agents are compensated by virtue of a commission on the sale of a life insurance product, the advice rendered by agents is frequently related to the sale of a life insurance product. On the other hand, Advisors frequently render advice with a bias against the purchase of life insurance, even when empirical data indicates otherwise. This bias against life insurance seems to be both in response to the agent bias toward life insurance, and due to the fact that the agents are the only reliable source of life insurance pricing information. In other words, advisors and agents are competitors rendering similar planning advice, but only the agents have access reliable life insurance pricing information. Advisors must either become willingly dependent on their competition (i.e. agents and brokers) for information affecting their recommendations, or must make recommendations that do not involve life insurance. Of course, this puts consumers in the awkward position of discerning between the advice and recommendations of two professionals—one with a bias towards life insurance and one with a bias against life insurance—which certainly does not serve the best interest and outcome for the consumer.

Still another drawback of the current system is that detailed policy information is guarded as proprietary to the insurance carriers. Accordingly without some means or method to aggregate competitive product information with the detail necessary for true comparisons, consumers are left to blindly make purchasing decisions that in no way correlate to the best product for their needs.

Accordingly, what is needed in the art is method for accurately comparing the value and performance of a permanent life insurance policy.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF THE INVENTION

The present invention comprises a method of evaluating a permanent life insurance policy comprising the steps of establishing a benchmark cost of insurance value, obtaining a policy illustration, resolving an illustrated cost of insurance value from the policy illustration, and comparing the benchmark cost of insurance value with the illustrated cost of insurance value.

A matrix of mortality profiles may be established wherein the benchmark cost of insurance is adjusted in relation to the matrix. The matrix may include gender-based, lifestyle and pricing method risk values. Gender-based risk values reflect the differing mortality rates experienced between males and females over a lifetime. Lifestyle-based risk values may acknowledge dangerous activities such as tobacco use, job occupation and the like. Pricing method risk values are based on the statistical evidence that affluent individuals generally lead healthier lifestyles while also purchasing substantial policy values.

In addition to comparing the illustrated cost of insurance value with the benchmark cost of insurance value, a number of other comparisons are preferable to gain a fair understanding of the performance and value of a permanent life insurance policy. Additional steps may include establishing a benchmark premium load value, resolving an illustrated premium load value from the policy illustration, and comparing the benchmark premium load value with the illustrated premium load value.

Fixed expenses may also be factored by establishing a benchmark fixed expense value, resolving an illustrated fixed expense value from the policy illustration, and comparing the benchmark fixed expense value with the illustrated fixed expense value. Policy earning values may also be analyzed by establishing a benchmark policy earning value, resolving an illustrated policy earning value from the policy illustration, and comparing the benchmark policy earning value with the illustrated policy earning value.

Policy earning values may be correctly adjusted and analyzed to account for carrier imposed fees by establishing an array carrier expenses deducted from the illustrated policy earning value, calculating a net illustrated policy earning value from the difference between the illustrated policy earning value and the array of carrier expenses, and comparing the benchmark policy earning value with the net illustrated policy earning value.

Resolving a benchmark unit-of-measure against which a given policy may be compared includes identifying a gender-based risk class for a given policy to be evaluated (e.g. male, female, unisex [used in corporate multi-life cases]), establishing an industry-standard gender-based COI constant, identifying a health profile-based risk class for a given policy to be evaluated (i.e. preferred plus, preferred, standard, smoker/tobacco user, substandard), establishing an health profile-adjusted COI constant, establishing a policy pricing method (i.e. "Retail", "Institutional", or "Experience-Rated") appropriate for the individual profile, establishing a pricing-method-adjusted benchmark COI constant (e.g. 74% of the lifestyle-adjusted COI constant for "Retail Pricing", 63% for "Institutional Pricing", and 55% for "Experience-Rated Pricing").

In the next step, a pricing-method-specific benchmark premium load value is established by calculating a average for all known products for which data is available, of all premium based policy expenses to include, but not limited to, State Premium Taxes, Federal Deferred Acquisition Cost (DAC) Taxes, Sales and Servicing Loads, Other Carrier Loads, and any other policy expense that is calculated in a fashion in which the policy premium is a variable that determines the expense, establishing a pricing-method-specific benchmark policy fixed-expense value by calculating a average for all known products for which data is available, of all policy fixed-expenses to include, but not limited to, Issue Charges, Underwriting Charges, Administration Charges, and any other policy expense that is calculated in a fashion in which the expense is expressed as stated, fixed or flat dollar amount, that can vary by age and policy year, but which is multiplied by some other variable, like the policy face amount, the number of months in the year.

An illustrated net average policy earning value (net of deductions for investment management fees, fund advisory fees, fund operating expenses and other expenses deducted at the fund account level) is provided and a pricing-method-specific benchmark policy-value-based expense value is established by calculating a average for all known products for which data is available, of all premium based policy expenses to include, but not limited to, M&E, other carrier charges, and any other policy expense that is calculated in a fashion in which the policy account value or policy cash value is a variable that determines the expense, establishing a pricing-method-specific "net-net" policy earning value by subtracting the policy-value-based expense value from the illustrated net average policy earning value, establishing a present value discount rate equal to the "net-net" policy earning value (i.e. that rate at which policy values would otherwise grow but for the deduction policy expenses, establishing a average Net Amount at Risk (NAR) by calculating the average of the difference between the death benefit of the hypothetical benchmark policy at the beginning of the calculation period for the benchmark policy, minus the sum of: the benchmark policy cash value at the beginning of the calculation period for the benchmark policy, plus the benchmark policy premium paid during the calculation period for the benchmark policy, less the benchmark policy premium loads deducted during the calculation period for the benchmark policy, less the benchmark policy fixed policy expenses deducted during the calculation period for the benchmark policy, plus the benchmark policy earnings credited to policy cash values during the calculation period for the benchmark policy, establishing a pricing-method-specific policy benchmark cost per $1 of insurance by calculating the quotient of a denominator equal to the average net amount at risk used to divide a numerator equal to the sum of: the present value of lifestyle-adjusted/pricing-method-adjusted benchmark COI constants for all policy years, the present value of pricing-method-specific benchmark premium load values for all policy years, the present value of pricing-method-specific benchmark policy fixed-expense values for all policy years.

In an alternative embodiment of the invention, a method of evaluating the cost competitiveness and the pricing adequacy of an insurance policy is provided by comparing the cost per $1 of insurance for a specific policy to the cost per $1 of insurance for the appropriate benchmark calculated above including the steps of, identifying the gender for an individual profile (as derived from the proposed illustration of hypothetical policy values), identifying the health profile for an individual profile (as derived from the proposed illustration of hypothetical policy values), identifying the pricing method for an individual profile (as derived from the proposed illustration of hypothetical policy values), identifying the COIs for a given policy (as derived from the proposed illustration of hypothetical policy values), identifying the premium load values for a given policy to include, but not limited to, State Premium Taxes, Federal Deferred Acquisition Cost (DAC) Taxes, Sales and Servicing Loads, Other Carrier Loads, and any other policy expense that is calculated in a fashion in which the policy premium is a variable that determines the expense (as derived from the proposed illustration of hypothetical policy values), identifying the policy fixed-expense values for a given policy to include, but not limited to, Issue Charges, Underwriting Charges, Administration Charges, and any other policy expense that is calculated in a fashion in which the expense is expressed as a stated, fixed or flat dollar amount, that can vary by age and policy year, but which is multiplied by some other variable, like the policy face amount, the number of months in the year, etc. (as derived from the proposed illustration of hypothetical policy values), identifying the illustrated (provided by the user, advisor, or prospective insurance applicant/policy owner from the illustration of hypothetical policy values) net average policy earning value (net of deductions for investment management fees, fund advisory fees, fund operating expenses and other expenses deducted at the fund account level) (as derived from the proposed illustration of hypothetical policy values), identifying the policy-value-based expense values for a given policy to include, but not limited to, M&E, Other Carrier Charges, and any other policy expense that is calculated in a fashion in which the policy account value or policy cash value is a variable that determines the expense (as derived from the proposed illustration of hypothetical policy values), establishing a policy-value-based expense percentage value by calculating the average over the duration of the policy of the quotient of a numerator equal to policy-value-based expense values for a given policy divided by a denominator equal to the sum of: the illustrated cash value at the beginning of the calculation period for the given policy, plus the illustrated premium paid during the calculation period for the given policy, less the illustrated premium loads deducted during the calculation period for the given policy, less the illustrated fixed policy expenses deducted during the calculation period for the given policy, plus the illustrated earnings credited to policy cash values during the calculation period for the given policy, establishing the "net-net" policy earning value for a given policy by subtracting the policy-value-based expense percentage value from the illustrated net average policy earning value (as derived from the proposed illustration of hypothetical policy values), establishing a present value discount rate equal to the "net-net" policy earning value (i.e. that rate at which policy values would grow but for the deduction of COIs, premium loads and policy fixed expenses;, establishing an average net amount at risk by calculating the average of the difference between the illustrated death benefit at the beginning of the calculation period for the given policy, minus the sum of: the illustrated cash value at the beginning of the calculation period for the given policy, plus the illustrated premium paid during the calculation period for the given policy, less the illustrated premium loads deducted during the calculation period for the given policy, less the illustrated fixed policy expenses deducted during the calculation period for the given policy, plus the illustrated earnings credited to policy cash values during the calculation period for the given policy, establishing a cost per $1 of insurance for a given policy by calculating the quotient (i.e. the result of dividing) of a denominator equal to the average net amount at risk for the given policy used to divide a numerator equal to the sum of: the present value of COI charges for all policy years for a given policy, the present value of premium load values for all policy years for a given policy, the present value of policy fixed-expense values for all policy years for a given policy, comparing the cost per $1 of insurance for a given policy to the appropriate benchmark calculated above, establishing the creditability of illustrated pricing factors by identifying the illustrated basis for underlying cost of insurance charges, expenses and earnings assumptions (e.g. pricing based on actual insurance company mortality, expense or investment experience, or pricing based on some assumed improvements in their current experience) under the premise that past performance is no guarantee of future results, but is certainly an indication of the credibility of future illustrated policy performance, and establishing the reliability of illustrated pricing factors by identifying the circumstances in which an insurance company may change the actual pricing of a given product to be different than that illustrated (e.g. Can policy pricing be changed for just the product under evaluation, or must the carrier change pricing for all products in a given pool? Can policy pricing be changed for in force policies without including the same change in newly sold policies? Are there any outside influences effecting the change in policy pricing?).

Another alternative embodiment of the invention includes a method of estimating pricing for a given policy by collecting varying amounts of policy pricing data related to cost of insurance rates, premium loads, fixed policy expenses, cash-value-based expenses, and illustrated earnings rates that is independent of the insurance company underwriting the given product comprising the steps of establishing two methods of collecting policy pricing data: (1) an Estimated Method giving the Advisor/user the ability to quickly, easily and anonymously enter a sampling of policy pricing data in varying amounts from a given illustration of hypothetical policy values that is then used to estimate policy pricing at various levels of precision, and (2) an Actual Method giving the user the ability to supply all policy pricing data elements from a given illustration of hypothetical policy values for all policy years which is then used to calculate actual policy pricing with maximum precision, collecting a gender-based risk class for a given policy to be evaluated (e.g. male, female, unisex [used in corporate multi-life cases]), establishing an industry-standard gender-based COI constant, collecting a health profile-based risk class for a given policy to be evaluated (i.e. preferred plus, preferred, standard, smoker/tobacco user, substandard), establishing an health profile-adjusted COI constant, establishing a policy pricing method, establishing a pricing-method-adjusted COI constant, establishing a method of determining the Net Amount at Risk (NAR) for a given policy year for a given policy by calculating the difference between the death benefit at the beginning of the calculation period for a given year of a given policy less the sum of: the illustrated cash value at the beginning of the calculation period for the given policy, plus the illustrated premium paid during the calculation period for the given policy, less the illustrated premium loads deducted during the calculation period for the given policy, less the illustrated fixed policy expenses deducted during the calculation period for the given policy, plus the illustrated earnings credited to policy cash values during the calculation period for the given policy, identifying the Cost of Insurance Charge/Deduction (COI Expense) for a sampling of policy years for a given policy (as derived from the proposed illustration of hypothetical policy values), establishing a method of determining Cost of Insurance Rates per $1 of policy death benefits (COI Rate) for a given policy year for a given policy by calculating the quotient (i.e. the result of dividing) of a numerator equal to the illustrated Cost of Insurance Charge/Deduction (COI Expense) for the given policy years for a given policy divided by a denominator equal to the Net Amount at Risk for the same policy years of the same policy, establishing a method of estimating Cost of Insurance COI charges for a given policy by determining the ratio of COI Rates from the sampling of policy years for a given policy divided by the Benchmark COI Rate, which is then multiplied by the Benchmark COI Rate for all policy years, establishing a method of varying the ease of supplying COI data inversely with calculating the precision of the COI estimate by providing the user with the ability to complete a minimum of 3 random iterations for disparate policy years to achieve maximum ease/minimum precision, 1 iteration for each 10 policy years for medium ease and precision, and 1 iteration for each 5 policy years for minimum ease/high precision, collecting the premium load values for sampling of policy years (1 sample for each year in which the premium load is different/unique) for a given policy (as derived from the proposed illustration of hypothetical policy values), collecting the policy fixed-expense values for a sampling of policy years (1 sample for each year in which the fixed-expense value is different/unique) for a given policy (as derived from the proposed illustration of hypothetical policy values), collecting the illustrated net average policy earning rate (net of deductions for investment management fees, fund advisory fees, fund operating expenses and other expenses deducted at the fund account level) for a sampling of policy years (1 sample for each year in which the net average policy earning rate is different/unique) (as derived from the proposed illustration of hypothetical policy values), collecting the policy-value-based expense values for a sampling of policy years (1 sample for each year in which the net average policy earning rate is different/unique) for a given policy (as derived from the proposed illustration of hypothetical policy values), establishing a policy-value-based expense percentage value by calculating the average over the duration of the policy of the quotient (i.e. the result of dividing) of a numerator equal to (i) policy-value-based expense values for a given policy divided by a denominator equal to the sum of: the illustrated cash value at the beginning of the calculation period for the given policy, plus the illustrated premium paid during the calculation period for the given policy, less the illustrated premium lo ads deducted during the calculation period for the given policy, less the illustrated fixed policy expenses deducted during the calculation period for the given policy, plus the illustrated earnings credited to policy cash values during the calculation period for the given policy, establishing the "net-net" policy earning value for a given policy by subtracting the policy-value-based expense percentage value from the illustrated net average policy earning value (as derived from the proposed illustration of hypothetical policy values), establishing a present value discount rate equal to the "net-net" policy earning value (i.e. that rate at which policy values would grow but for the deduction of COIs, premium loads and policy fixed expenses, establishing a method for estimating premium load values for all policy years from premium load values collected for the sampling of policy years by calculating the present value of each unique premium load value for each policy year, establishing a method for estimating policy fixed-expense values for all policy years from premium load values collected for the sampling of policy years by calculating the present value of each unique policy fixed-expense value for each policy year, establishing a method for estimating policy-value-based expense values for all policy years from policy-value-based expense values for a sampling of policy years by calculating the present value of each unique policy-value-based expense value for each policy year, establishing a method of estimating the cost per $1 of insurance for a given policy by calculating the quotient (i.e. the result of dividing) of a denominator equal to the average estimated net amount at risk calculated for the sampling of year for which data was provided for the given policy which is then used to divide a numerator equal to the sum of: the present value of estimated COIs for all policy years for a given policy, the present value of estimated premium load values for all policy years for a given policy, and the present value of policy fixed-expense values for all policy years for a given policy.

Another embodiment of the invention includes a method of dynamically increasing the precision of the benchmark cost per $1 of insurance computation over time by continually compiling policy pricing information in a database comprising the steps of establishing a database for compiling: policy pricing data related to cost of insurance rates, premium loads, fixed policy expenses, cash-value-based expenses, and historical earnings rates, whether pricing factors are based on actual or projected insurance company experience as to mortality, expense or investment experience, and changes to pricing factors over time, and the circumstances surrounding the changes. Establishing an initial benchmark unit-of-measure for evaluating the cost competitiveness and the pricing adequacy of an insurance policy using the benchmark for a given pricing method created above, populating the database with the initial unit-of-measure/benchmark for evaluating the cost competitiveness and the pricing adequacy of an insurance policy for each pricing method, populating/updating the database with actual policy pricing data collected from public domain information sources (e.g. the product prospectus or private offering memorandum for a given policy, State Department of Insurance filings for a given product from a given carrier, etc.) as that data becomes available (i.e. as new products are filed with the SEC and approved by the State Department of Insurance), populating/updating the database with actual policy pricing data collected directly from insurance companies (e.g. from illustrations of hypothetical policy values for a given product generated by computer software provided by the respective insurance company, and written product guides published by the respective insurance company), populating/updating the database with estimated pricing data calculated above., establishing over time an average of actual and estimated policy pricing data collected and compiled in the database in order to compute an additional/new replacement benchmark that represents the average policy pricing for each pricing component as they relate to cost of insurance rates, premium loads, fixed policy expenses, cash-value-based expenses, and illustrated earnings rates.

A method of distributing insurance policies in which the selection and ultimate purchase of the product is determined by both qualitative factors (the perceived level of service associated with the insurance company and the distributor/servicing organization, the perceived financial strength and claims paying ability of an insurance company, etc.), and quantitative factors (like policy costs, the credibility of illustrated policy pricing assumptions, and the reliability of those pricing assumptions as it relates to actual policy performance over time) comprising the steps of: establishing an objective and uniform means of identifying, calculating, benchmarking and comparing both the cost-effectiveness and the pricing adequacy of an insurance policy, establishing an objective and uniform means of identifying and quantifying the credibility of illustrated policy pricing factors, establishing an objective and uniform means of identifying and quantifying the reliability of illustrated policy pricing factors, establish a means of collecting policy pricing data on any/every product available in the marketplace, categorizing all policy pricing data into the following 4 pricing elements: Cost of Insurance charges, premium load values including, but not limited to, State Premium Taxes, Federal Deferred Acquisition Cost (DAC) Taxes, Sales and Servicing Loads, Other Carrier Loads, and any other policy expense that is calculated in a fashion in which the policy premium is a variable that determines the expense, policy fixed-expense values including, but not limited to, Issue Charges, Underwriting Charges, Administration Charges, and any other policy expense that is calculated in a fashion in which the expense is expressed as stated, fixed or flat dollar amount, that can vary by age and policy year, but which is multiplied by some other variable, like the policy face amount, the number of months in the year, etc., policy-value-based expense values including, but not limited to, M&E, Other Carrier Charges, and any other policy expense that is calculated in a fashion in which the policy account value or policy cash value is a variable that determines the expense, normalizing each of the 4 types of policy expenses to adjust for timing differences in the assessment of the charges, compiling normalized policy pricing data all policies available in the marketplace in this standardized format that lends itself to easy retrieval and comparison, establish a means of dynamically improving the precision of the pricing data as more and more policy pricing data is collected over time, making the data available to Advisors such that they can use the data to determine the most suitable product for their client from the full universe of products available in the marketplace (not just those products which a particular agent or broker may be licensed to sell, which is by marketplace definition only those products for which he/she has dependable pricing information).

In a preferred embodiment of the invention, the following economic incentives are provided to motivate Advisors of prospective insurance buyers and prospective insurance buyers themselves to use the service: (1) prospective buyers will be motivated by promise of premium savings associated with identifying most cost-effective policy, and the peace of mind associated with identifying a responsibly-priced policy with credible and reliable pricing assumptions, (2) advisors will be motivated by the ability to provide a new service that is consistent with their existing servicing offerings (i.e. an informational reference service that can be used to research and based recommendations to their clients), that meets their rules for independence, and that fits within their existing fee-for-service compensation model; (3) advisors will also be motivated to use the data by the ability to be transitionally compensated; (4) motivating Advisors to introduce other Advisors to the service by providing an economic incentive to virally market the service (e.g. waive subscription fees for any Advisor who causes another Advisor to become registered with the service); (5) motivating Advisors to encourage their clients to enter into insurance policy transactions through the service by providing an economic incentive to purchase the policy through a fulfillment center affiliated with the service (e.g. waive subscription fees for any Advisor who causes a transaction to be closed through an affiliated fulfillment center); and (6) establishing co-marketing and fulfillment agreements with affiliated fulfillment centers who are properly licensed with all insurance companies in all 50 States such that an advisor can research, recommend and facilitate the purchase of the most cost-effective, yet responsibly priced policy available in the entire marketplace.

It is therefore an object of the present invention to provide a method to quantify the value of a permanent life insurance product against an industry benchmark.

It is another object of the present invention to provide a means to compare two competing permanent life insurance products.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 8 is a functional block diagram of the process an average net amount at risk.

DETAILED DESCRIPTION OF THE PREFERRED EMBODIMENT

Figure 1:
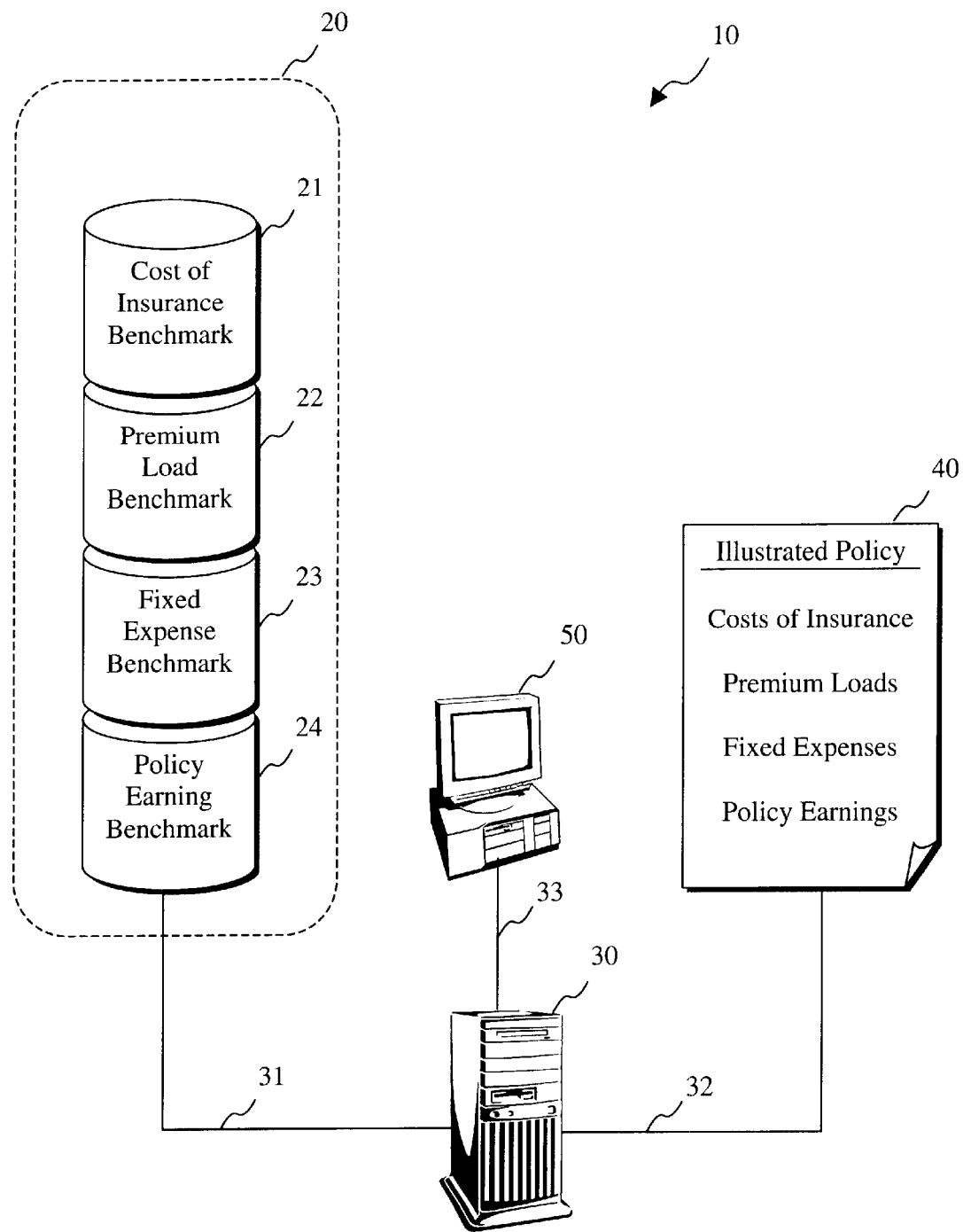
FIG. 1 is a functional block diagram illustrating the comparison of an illustrated insurance policy and a database of benchmark values embodied in a client-server architecture.

Referring initially to FIG. 1, it will there be seen that an illustrative embodiment of the present invention is denoted by the reference number 10 as a whole wherein the invention comprises establishing a benchmark cost of insurance value 20 from an aggregate of benchmark values including cost of insurance benchmark 21, premium load benchmark 22, fixed expense benchmark 23 and policy earning benchmark 24. In a preferred embodiment of the invention, a client data server 30 is in data communication with the database 20 by a first network connection 31. Data relating to an illustrated policy 40 is entered into the client data server 30 via a second network connection 32. This data may originate from agents, brokers, carriers and even public record sources. An advisor client station 50 is in data communication with the client data server 30 via a third network connection 33. The illustrated policy 40 is analyzed by the client data server 30 to resolve an illustrated cost of insurance value. The illustrated cost of insurance value is then compared to the benchmark cost of insurance value 20. The results are then transmitted via the third network connection 33 from the client data server 30 to the advisor client station 50. The results may be displayed on the advisor client station 50 by a proprietary network application or, preferably, by a web browser means.

For illustrative purposes, the logistics of the method may include implementing a Microsoft SQL 2000 or Oracle database server to act as a repository for the benchmark data. The client data server 30 may be a Microsoft Windows 2000 Advanced Server or Datacenter and the first network connection 31 may be an Ethernet-type LAN connection between the database server and client data server 30. As will be discussed below, the illustrated policy 40 may be initially received by fax, email, postal mail or in a database structure such as Microsoft Excel, Paradox, DB2, or XML. Alternatively, the illustrated policy 40 may be received from the advisor client station 50 through the third network connection 33.

Figure 2:
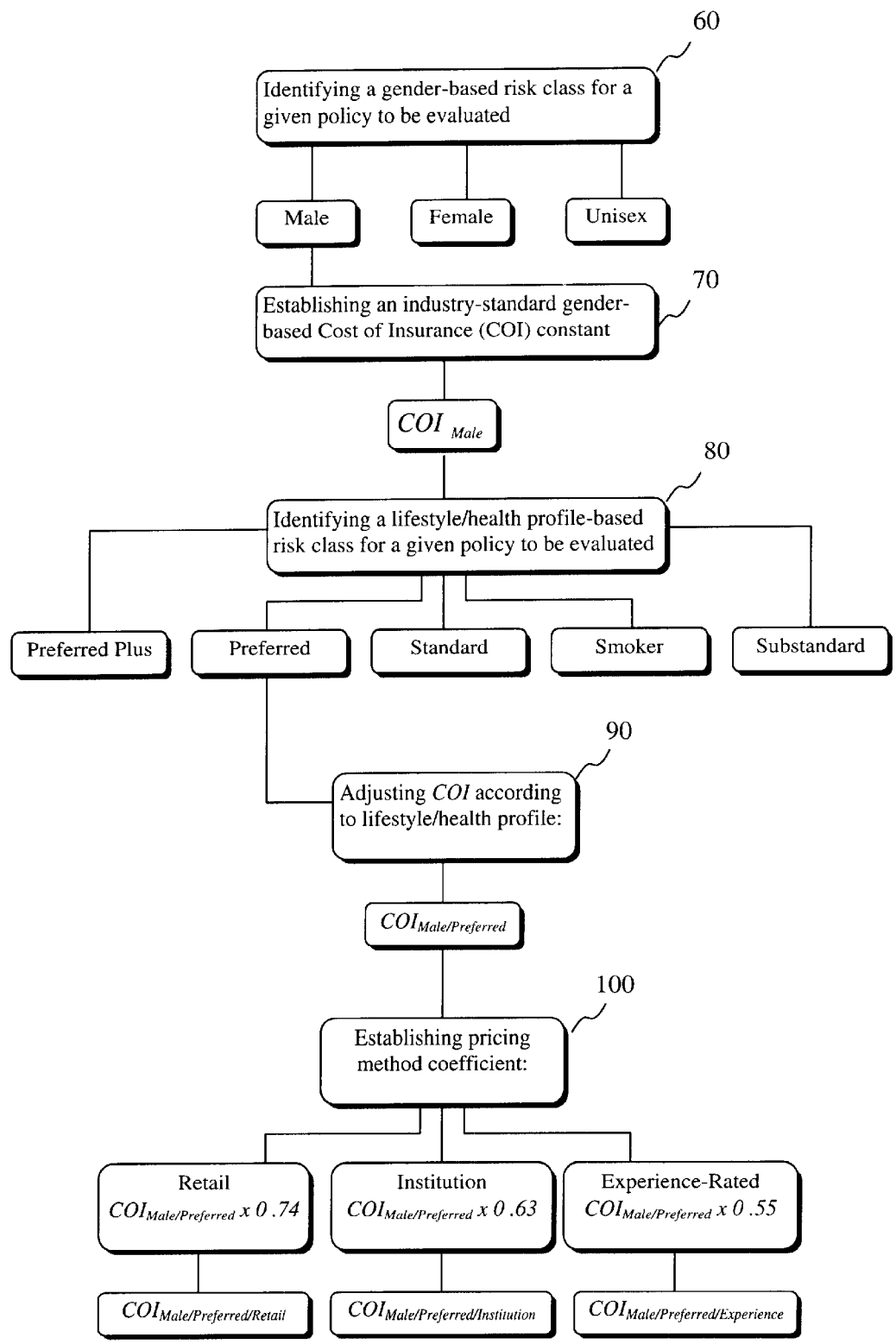
FIG. 2 is a functional block diagram illustrating the process of resolving a cost of insurance constant.

FIG. 2 illustrates the method of establishing a benchmark of mortality profiles. A gender-based risk class is identified for a given policy to be evaluated 60. This is typically split in male, female and unisex categories. The industry-based COI is then applied to the gender-based risk class 70. In this illustrative example, a male risk class is selected. Next, a health profile is identified 80. Typical categories include preferred plus, preferred, standard, smoker and substandard, each categories representing a higher mortality risk respectively. The COI is then adjusted according to the health profile 90. In this example, we continue to use the male profile in conjunction with the "preferred"health category. Finally, a pricing method co-efficient is established 100. The pricing method coefficient factors affluence into the solution based on empirical data that, all other variables being equal, wealthier individuals tend to have better access to health care and thus, require less claims be paid to their beneficiaries. For example, pricing methods may be categorized as retail, institutional and experience-rated. In our example, individuals categorized as "retail" tend to experience only 74% of the average mortality. Institutional individuals only experience 63% of the average mortality for their personal profile. Finally, experience-rated individually only suffer 55% of the average mortality for their personal characteristics. Accordingly, it can be understood that experience-rated individuals are more profitable to insure for carriers, as those individuals are statistically healthier. By the same token, individuals within the experience-rated category are reasonably entitled to pay less for life insurance since they are a superior risk for the carriers to assume.

As evident by the above, a large number of industry standard, or benchmark, COIs may exist for so many distinct profiles. Expanded further, these benchmarks must be available for an individual's maximum lifespan, typically up to 100 years. Therefore, a large matrix must be populated with benchmarks to provide a meaningful analysis of illustrated policies under consideration.

Figure 3:
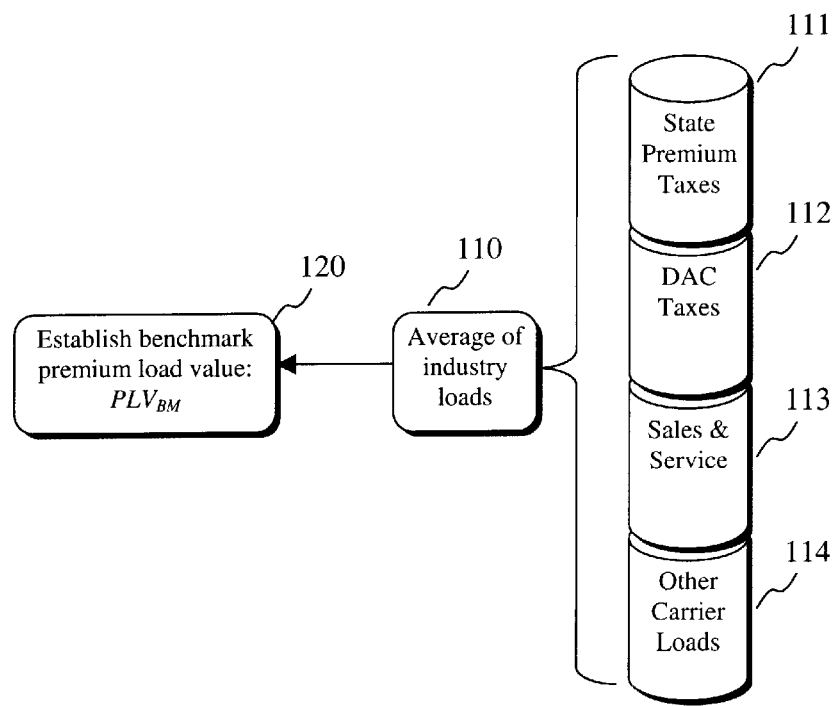
FIG. 3 is a functional block diagram of the process of resolving a benchmark premium load value.
Figure 4:
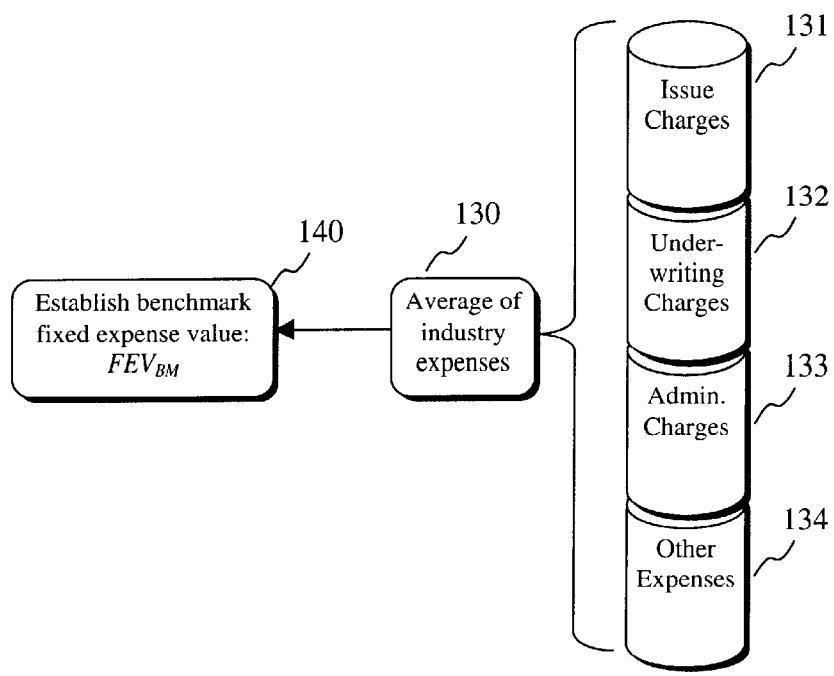
FIG. 4 is a functional block diagram of the process of resolving a benchmark fixed expense value.
Figures 5, 6, 7:
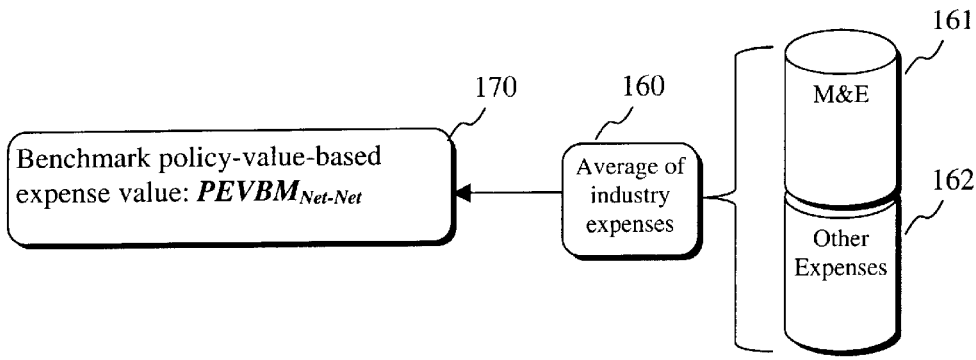
FIG. 5 is a functional block diagram of the process of resolving an illustrated net average policy earning value.
FIG. 6 is a functional block diagram of the process of a benchmark policy-value-based expense value.
FIG. 7 is a functional block diagram of the process of resolving a $\text{Net}_{Net}$ policy earning value from the illustrated net average policy earning value and the illustrated policy-value based expense value.
Figure 10:
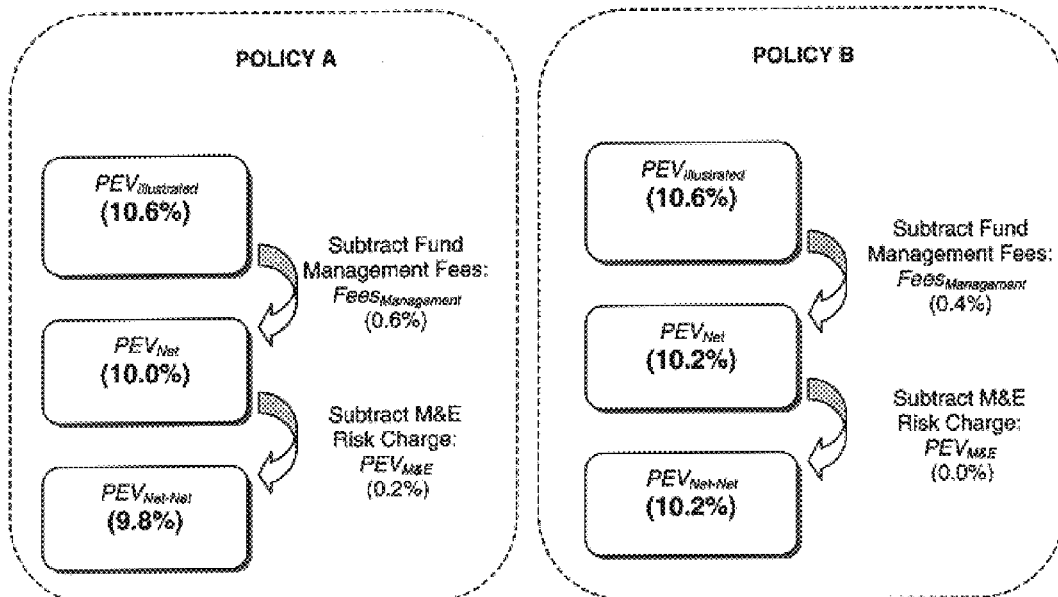
FIG. 10 is a functional block diagram illustrating the resolution of a true "net-net" average policy earning value compared between two insurance policies.

FIG. 3 illustrates the resolution of a benchmark premium load value 120 taken from the average of industry loads 110 including state premium taxes 111, DAC taxes 112, sales and service fees 113 and other carrier loads 114. FIG. 4 illustrates the resolution of a benchmark fixed expense value 140 taken from the average of industry expenses 130 including issue charges 131, underwriting charges 132, administration charges 133 and other expenses 134. Carriers often publish average policy earning values regarding the performance of their products. In FIG. 5, a net average policy earning value is resolved by subtracting management fees from the illustrated policy earning value to achieve the illustrated net average policy earning value 150. In FIG. 7, M&E charges 161 are deducted from the illustrated net average policy earning value 150 to resolve the net-net illustrated policy earning value 180. Once this illustrated net-net value is resolved for the illustrated policy, it may be compared to the benchmark net-net value 170 resolved in FIG. 6 by averaging industry expenses 160 such as M&E charges 161 and other related expenses 162. FIG. 10, illustrates how two illustrated policies having the same policy earning values vary substantially in the present invention. Both policies A and B have illustrated rates of 10.6%. However, Policy A charges a management fee of 0.6% while Policy B only charges 0.4%. At this point Policy A has a net rate of 10.0% while Policy B has a net rate of 10.2%. When M&E risk charges are imposed, Policy A's rate is reduced to 9.8% while Policy B's rate is maintained at 10.2%. Therefore, assuming all other factors are equivalent, Policy B is more efficient.

Figure 9:
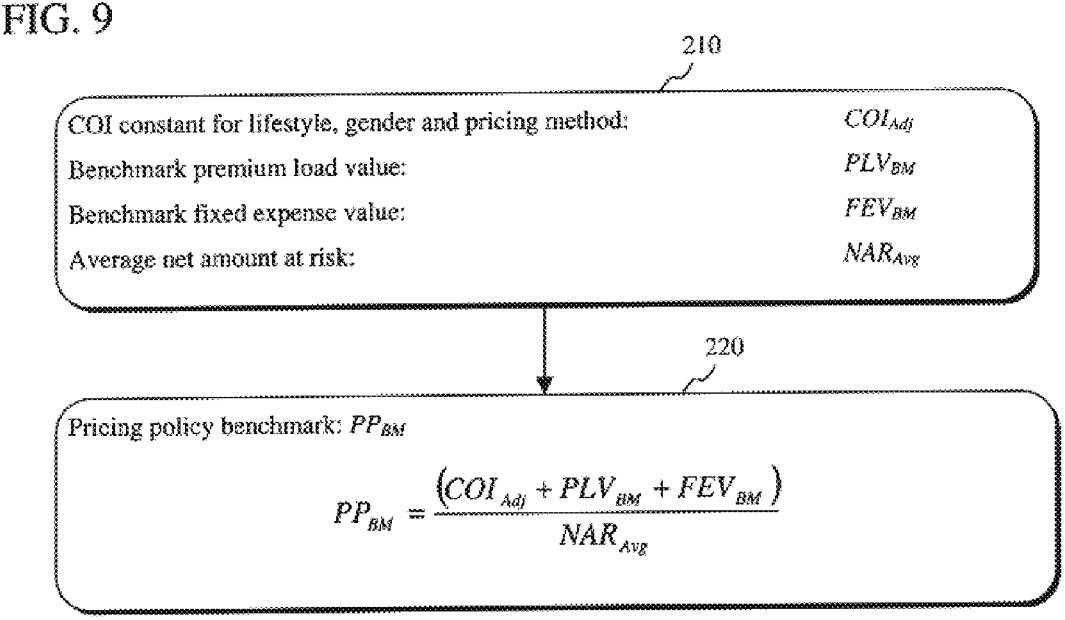
FIG. 9 is a functional block diagram of the process of resolving a pricing policy benchmark.

FIG. 8 illustrates the variables 190 and equation 200 for the average net amount at risk. Net amount of risk is generally defined as the actual amount of pure life insurance protection, calculated as the difference between the policy reserve at that point and the face amount. For instance, it is common for permanent life insurance policies with a level death benefit to be priced such that policy cash values and policy death benefits become equal by design at the maturity or endowment age of the policy (defined by statute between age 95 and 100 depending on the policy). As such, as cash values increase and the death benefit remains level/the same, the "net at risk" death benefit (or net amount at risk) declines. FIG. 9 illustrates the variables 210 and equation 220 for resolving a pricing policy benchmark.

Figure 11:
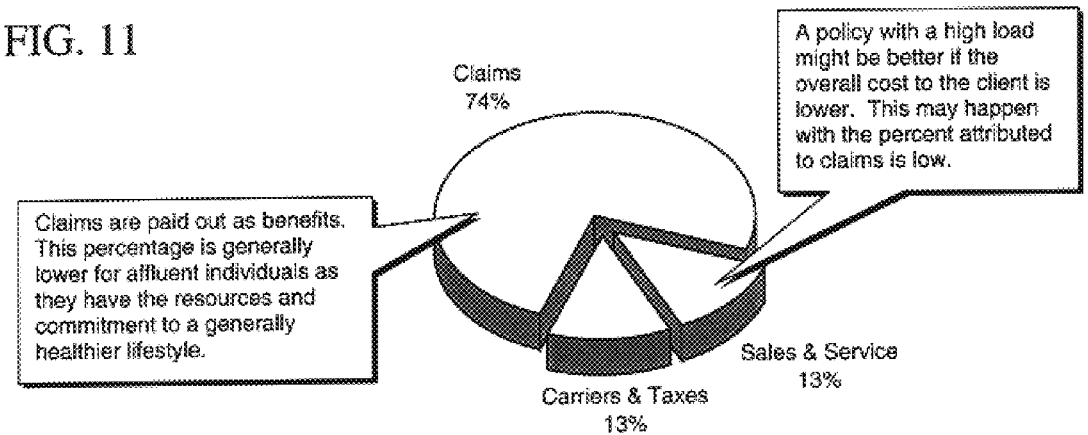
FIG. 11 is a partially exploded pie chart showing an exemplary breakdown in premiums.

FIG. 11 illustrates the overall breakdown of costs that are attributable to insurance premiums. For illustrative purposes, carriers and taxes account for 13% of the premiums, sales and service account for another 13%, and claims account for the remaining 74% of premium payments. As discussed previously, if the carrier's policy insures only healthy, affluent individuals, then the claims percentage might reasonably be expected to drop from 74% to 55%. With less claims to pay, the carrier and agents may earn a greater portion of the premiums paid or lower the premiums on the policy to make the policy more attractive to the buyer. FIG. 11 also illustrates the misconception of purchasing a policy simply on the basis of the "loads." Even if the sales, service and carrier expenses are high, if the claims (COIs) are low, the policy might be equivalent or even superior to a "no-load" policy.

Figure 12:
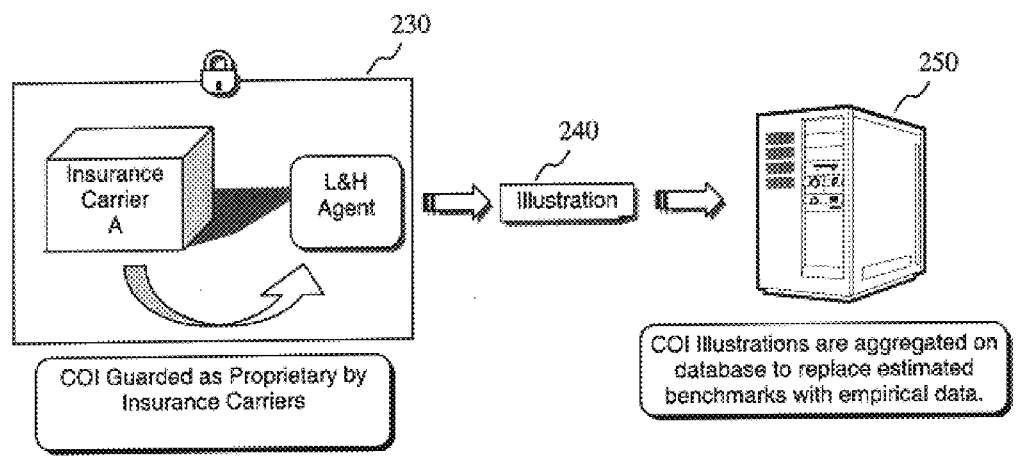
FIG. 12 is a functional block diagram illustrating the data path of insurance policy illustrations according to the current invention.

FIG. 12 shows the proprietary boundary 230 currently held by insurance carriers and their respective agents.

Although some public record disclosures are mandated depending on the jurisdiction, freely obtaining COIs from carriers on a wholesale basis is not yet available. However, the present invention provides for the aggregation of transmitted policies 240 into an illustration database 250. As illustrated policy information is collected, benchmark values may be resolved from empirical data rather than theoretical and direct comparisons between two or more individual policies may be achieved.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of evaluating a permanent life insurance policy comprising:
    obtaining a first policy illustration;
    resolving an illustrated premium load value from the policy illustration;
    resolving an illustrated fixed expense value from the first policy illustration;
    resolving an illustrated cost of insurance value from the first policy illustration;
    resolving an illustrated net amount at risk value from the first policy illustration;
    establishing a first pricing policy value for the first policy illustration from the sum of the illustrated cost of insurance value, the illustrated premium load value, and the illustrated fixed expense value divided by the illustrated net amount at risk value; and
    comparing the first pricing policy value with a second pricing policy value.

2. The method of claim 1 wherein the first and second pricing policy values are expressed in units of one dollar.

3. The method of claim 1 wherein the illustrated policy expense value for the first policy illustration includes an illustrated premium load value from the first policy illustration.

4. The method of claim 1 wherein the illustrated policy expense value for the first policy illustration includes an illustrated fixed expense value from the first policy illustration.

5. The method of claim 1 wherein the illustrated premium load value for the first policy illustration includes an illustrated cash-value based expense value from the first policy illustration.

6. The method of claim 1 wherein the illustrated premium load value for the first policy illustration includes investment management fees.

7. The method of claim 1 wherein the illustrated premium load value for the first policy illustration includes M&E risk charges.

8. The method of claim 1 wherein the illustrated fixed expense value for the first policy illustration includes an illustrated State Premium Tax value.

9. The method of claim 1 wherein the illustrated fixed expense value for the first policy illustration includes an illustrated Deferred Acquisition Cost (DAC) tax value.

10. The method of claim 1 wherein the illustrated premium load value for the first policy illustration includes an illustrated sales load value.

11. The method of claim 1 wherein the illustrated fixed expense value for the first policy illustration includes an illustrated fixed periodic expense value.

12. The method of claim 1 wherein an average of pricing policy values are established from a plurality of policy illustrations.

13. The method of claim 1 wherein an average of pricing policy values are established from a plurality of policy illustrations to resolve a benchmark pricing policy value.

14. The method of claim 1 further comprising:
    establishing a matrix of mortality profiles; and
    adjusting the illustrated cost of insurance value according to the matrix.

15. The method of claim 14 wherein the matrix comprises gender-based risk values.

16. The method of claim 14 wherein the matrix comprises lifestyle-based risk values.

17. The method of claim 14 wherein the matrix comprises pricing method risk values.

18. A method of evaluating a permanent life insurance policy comprising:
    obtaining a first policy illustration;
    resolving an illustrated premium load value from the policy illustration;
    resolving an illustrated fixed expense value from the first policy illustration;
    resolving an illustrated cost of insurance value from the first policy illustration;
    resolving an illustrated fixed expense value from the first policy illustration;
    establishing a calculation period;
    resolving an illustrated net amount at risk value from the first policy illustration for each year in the calculation period;
    dividing the sum of the illustrated net amount at risk for all the years in the calculation period by the count of years to establish an average net amount at risk
    establishing a first pricing policy value for the first policy illustration from the sum of the illustrated cost of insurance value, the illustrated premium load value, and the illustrated fixed expense value divided by the illustrated net amount at risk value; and
    comparing the first pricing policy value with a second pricing policy value.

19. The method of claim 18 wherein the first and second pricing policy values are expressed in units of one dollar.

20. The method of claim 18 wherein the illustrated policy expense value for the first policy illustration includes an illustrated premium load value from the first policy illustration.

21. The method of claim 18 wherein the illustrated policy expense value for the first policy illustration includes an illustrated fixed expense value from the first policy illustration.

22. The method of claim 18 wherein the illustrated premium load value for the first policy illustration includes an illustrated cash-value based expense value from the first policy illustration.

23. The method of claim 18 wherein the illustrated premium load value for the first policy illustration includes investment management fees.

24. The method of claim 18 wherein the illustrated premium load value for the first policy illustration includes M&E risk charges.

25. The method of claim 18 wherein the illustrated fixed expense value for the first policy illustration includes an illustrated State Premium Tax value.

26. The method of claim 18 wherein the illustrated fixed expense value for the first policy illustration includes an illustrated Deferred Acquisition Cost (DAC) tax value.

27. The method of claim 18 wherein the illustrated premium load value for the first policy illustration includes an illustrated sales load value.

28. The method of claim 18 wherein the illustrated fixed expense value for the first policy illustration includes an illustrated fixed periodic expense value.

29. The method of claim 18 wherein an average of pricing policy values are established from a plurality of policy illustrations.

30. The method of claim 18 wherein an average of pricing policy values are established from a plurality of policy illustrations to resolve a benchmark pricing policy value.

31. The method of claim 18 further comprising:
    establishing a matrix of mortality profiles; and
    adjusting the illustrated cost of insurance value according to the matrix.

32. The method of claim 31 wherein the matrix comprises gender-based risk values.

33. The method of claim 31 wherein the matrix comprises lifestyle-based risk values.

34. The method of claim 31 wherein the matrix comprises pricing method risk values.

* * * * *